(12) United States Patent
Seyler et al.

(10) Patent No.: US 6,959,735 B2
(45) Date of Patent: Nov. 1, 2005

(54) MULTILAYER FLEXIBLE HOSE

(75) Inventors: Andreas Seyler, Gründau-Lieblos (DE); Thomas Rösch, Linsengericht (DE)

(73) Assignee: Veritas AG, Gelnhausen (DE)

( * ) Notice: Subject to any disclaimer, the term of this patent is extended or adjusted under 35 U.S.C. 154(b) by 133 days.

(21) Appl. No.: 10/700,707

(22) Filed: Nov. 5, 2003

(65) Prior Publication Data

US 2004/0129330 A1 Jul. 8, 2004

(30) Foreign Application Priority Data

Nov. 5, 2002 (DE) .................................... 102 51 549

(51) Int. Cl.[7] ............................................. F16L 11/08
(52) U.S. Cl. ..................... 138/127; 138/143; 138/138; 138/126
(58) Field of Search ................. 138/127, 143, 138/126, 124, 137, 138, 121, 173

(56) References Cited

U.S. PATENT DOCUMENTS

| | | | | |
|---|---|---|---|---|
| 376,401 | A | * 1/1888 | Wilder et al. ............... | 138/127 |
| 1,052,106 | A | * 2/1913 | Voorhees .................... | 138/127 |
| 3,540,486 | A | * 11/1970 | Flounders ................... | 285/256 |
| 3,913,625 | A | * 10/1975 | Gazda et al ................ | 138/140 |
| 4,275,769 | A | * 6/1981 | Cooke ........................ | 138/109 |
| 5,702,132 | A | * 12/1997 | Friederich et al. .......... | 285/235 |
| 5,778,941 | A | * 7/1998 | Inada ......................... | 138/134 |
| 5,865,216 | A | * 2/1999 | Youngs ...................... | 138/135 |
| 6,131,614 | A | 10/2000 | Eastham et al. ............ | 138/110 |
| 6,363,974 | B1 | * 4/2002 | Perez et al. ................ | 138/130 |
| 6,401,761 | B1 | 6/2002 | Katayama et al. .......... | 138/138 |
| 6,408,891 | B1 | * 6/2002 | Jung et al. ................. | 138/127 |
| 6,415,825 | B1 | * 7/2002 | Dupoiron et al. ........... | 138/127 |
| 6,631,743 | B2 | 10/2003 | Enders et al. .............. | 138/138 |

FOREIGN PATENT DOCUMENTS

| | | |
|---|---|---|
| DE | 24 03 028 | 7/1975 |
| DE | 3346191 | 7/1985 |
| DE | 3441879 A1 | 5/1986 |
| DE | 3610656 | 10/1987 |
| DE | 91 08 303.6 | 8/1991 |
| DE | 4224526 | 1/1994 |
| DE | 44 44 994 A1 | 6/1995 |
| DE | 42 35 825 C1 | 4/1998 |
| DE | 198 37 498 A1 | 2/2000 |
| DE | 298 23 963 U1 | 2/2000 |
| DE | 19932198 | 1/2001 |
| DE | 20118361 | 2/2002 |
| EP | 0591 831 A2 | 4/1994 |
| EP | 0657 273 A2 | 6/1995 |
| EP | 0759136 | 2/1997 |
| EP | 1 020 673 A1 | 7/2000 |
| EP | 1 126 204 A2 | 8/2001 |
| EP | 1138998 | 10/2001 |
| EP | 1162397 | 12/2001 |
| FR | 2 823 550 | 10/2002 |
| JP | 07-171930 | 11/1995 |
| WO | 01/23794 | 4/2001 |

* cited by examiner

*Primary Examiner*—Patrick Brinson
(74) *Attorney, Agent, or Firm*—Buchanan Ingersoll PC

(57) ABSTRACT

The present invention relates to a multilayer flexible hose, preferably for fuel or coolant lines in an automotive vehicle, comprising a support layer and a metallic barrier layer which is fixedly connected to said support layer, and to a method of producing the same.

24 Claims, 1 Drawing Sheet

MULTILAYER FLEXIBLE HOSE

Figure 1:
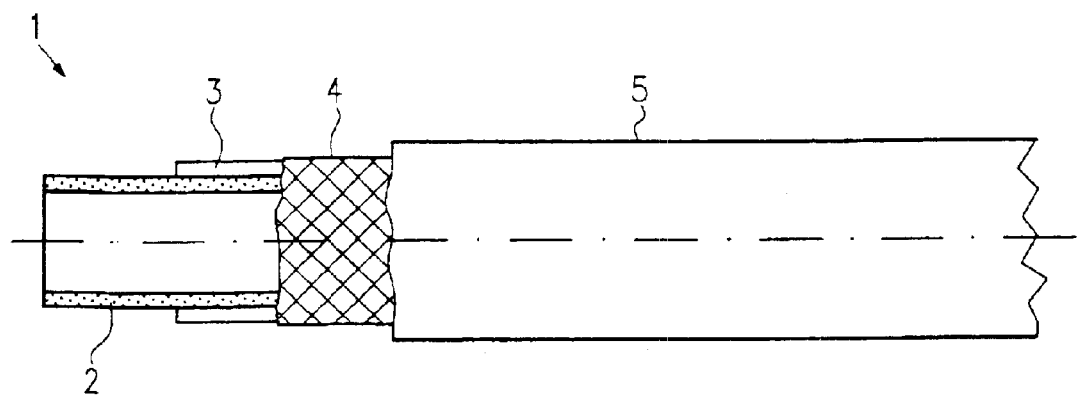

The invention relates to a multilayer flexible hose, preferably for fuel or coolant lines in an automotive vehicle, comprising a support layer and a metallic barrier layer which is fixedly connected to said support layer, Such a hose is known from e.g. from EP 1 138 998 A2. Such hoses are used e.g. in an automotive vehicle for transporting a coolant. Such hoses comprise a metallic barrier layer and a support layer. The metallic barrier layer prevents the coolant from diffusing out of the hose. The support layer is provided for imparting strength to the hose.

The requirements on the flexibility of such hoses are high in the field of automotive engineering. Furthermore, a reliable protection against a leakage of fluids from such hoses should be guaranteed. The present hoses do not always satisfy these requirements.

It is the object of the present invention to improve a hose of the type mentioned at the beginning, in particular to improve the flexibility and the protection against a leakage of fluids.

According to the present invention, this object is achieved by a multilayer flexible hose of the type mentioned at the beginning, in which the support layer is made of rubber and the barrier layer has a layer thickness between 0.1 mm and 0.5 mm.

This solution has the advantage that a leakage of fluid from the hose can be prevented effectively and that a high flexibility of the hose is guaranteed simultaneously.

It may be of advantage when the support layer is made of synthetic rubber, since this will increase the strength of the connection between the barrier layer and the support layer.

When the barrier layer is in full-area contact with the support layer and/or a neighbouring layer, the adherence of the barrier layer to the support layer and/or a neighbouring layer can be increased still further.

Furthermore, it may be of advantage when the barrier layer is the innermost layer. The imperviousness of the hose can be increased still further in this way.

When the barrier layer is made of metal, the imperviousness of the hose can be increased still further.

In addition, it may be of advantage when the barrier layer is made of aluminium. The imperviousness of the hose can be increased still further in this way.

Furthermore, it may also prove advantageous when the barrier layer is made of pure aluminium 99.5. The barrier layer can adhere to the support layer even more effectively in this way.

According to an advantageous further development of the invention, a reinforcement layer can be provided, whereby damage to the barrier layer can be prevented even more effectively.

It may also be prove to be advantageous, when the reinforcement layer borders on the support layer. The barrier layer can be protected even more effectively in this way.

It may also be of advantage when the reinforcement layer is made of a synthetic fabric, since damage to the barrier layer can thus be prevented even more effectively.

In addition, it may be of advantage when the reinforcement layer is made of a polyaramid fabric, since the barrier layer can be protected even more effectively in this way.

Furthermore, it may prove to be advantageous when an outer cover layer made of a flexible synthetic material is provided. Such an arrangement will increase the stability of the hose still further.

When the outer cover layer is made of synthetic rubber, the strength of the hose can be increased still further.

It may be of advantage when the cover layer borders on the reinforcement layer. By means of such an arrangement, the strength of the hose can be increased still further.

It may also be of advantage when the support layer and the cover layer have essentially the same layer thickness. This will lead to a further reduction of costs.

Furthermore, it may be of advantage when the support layer has a layer thickness between 0.6 mm and 1.5 mm, since a good strength as well as sufficient flexibility will be achieved in this way.

It may also prove to be advantageous when the cover layer has a layer thickness between 1 mm and 1.5 mm. In this way, it will be possible to achieve a sufficiently high flexibility of the hose in combination with a good strength.

In addition, it may be of advantage when the barrier layer is arranged between an interior layer and the support layer. The barrier layer can be protected even more effectively in this way.

According to an advantageous further development of the invention, the interior layer can be made of a polymeric synthetic material. The barrier layer can be protected even more effectively in this way.

When the interior layer is made of a thermoplastic polymer, the barrier layer can be protected even more effectively.

It may also be of advantage when the layer thickness of the interior layer is smaller than the layer thickness of the cover layer, since a ratio of this type will guarantee a good strength as well as a sufficiently high flexibility of the hose.

It may also prove to be advantageous when the interior layer has a layer thickness which is, at most, half the layer thickness of the cover layer, since this ratio is suitable for producing a hose having a good strength and a sufficiently high flexibility.

In addition, it may be of advantage when the interior layer has a layer thickness of 0.5 mm. The flexibility of the hose can be can be increased still further in this way.

In accordance with an advantageous further development of the invention, the barrier layer can be a profiled layer. This will allow a further increase in the flexibility of the hose.

In accordance with an advantageous further development of the invention, a compensation layer can be provided between the interior layer and the barrier layer. The hold of the barrier layer can thus be improved still further.

When the compensation layer is a thermoplastic polymer layer, the hold of the barrier layer can be increased still further.

It may also be of advantage, when the compensation layer has an amplitude following the profile of the barrier layer and a smooth inner side. This type of arrangement will improve the adherence of the layers still further.

Furthermore, a method of producing a multilayer flexible hose according to the present invention is claimed, in the case of which the barrier layer is applied in the form of a rolled foil. This kind of method guarantees a good adherence of the barrier layer. In addition costs can be reduced substantially.

Figure 2:
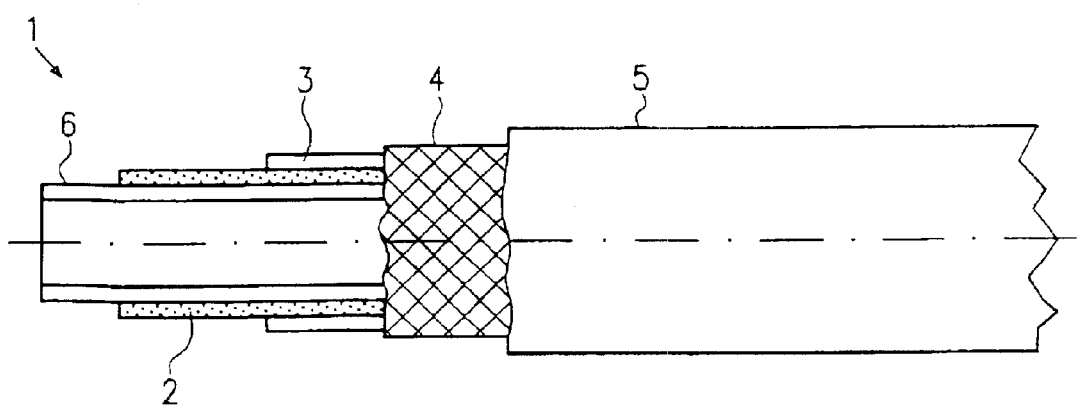
Figure 3:
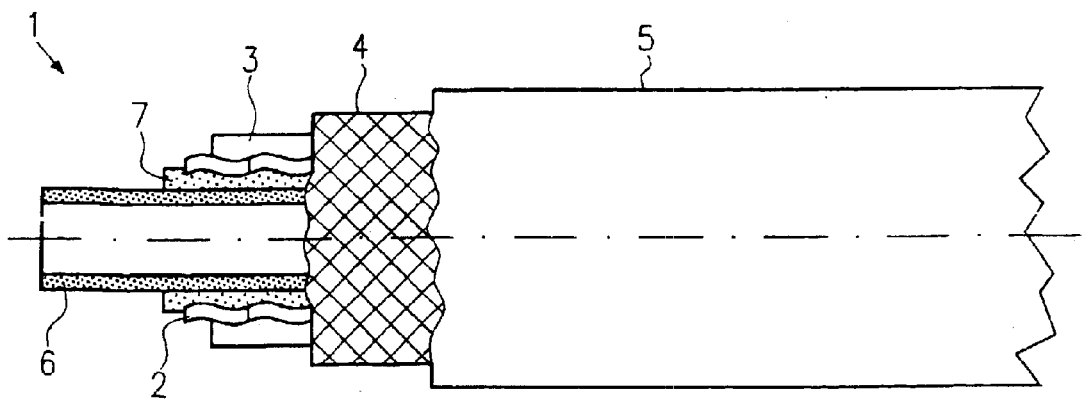

In the following, the invention will be explained in detail making reference to several embodiments and associated drawings in which FIG. 1 shows a first embodiment of a multilayer flexible hose, FIG. 2 shows a second embodiment of said multilayer flexible hose, and FIG. 3 shows a third embodiment of said multilayer flexible hose.

FIG. 1 shows a first embodiment of a multilayer flexible hose 1 according to the present invention. This hose 1 is provided with a metallic barrier layer 2. A material which proved to be advantageous for this barrier layer 2 is aluminium (Al), especially pure aluminium 99.5 with a layer thickness between 0.1 mm and 0.5 mm. In the range between 0.1 mm and 0.5 mm, good protection is provided with respect to imperviousness. This applies to uncontrolled leakage of the conveyed fluids from the interior of the hose 1 as well as to the ingress of media from outside through the wall into the interior of the hose 1, whereby contamination of the fluid can be avoided. Furthermore, a layer thickness in the specified range guarantees a sufficiently high strength, e.g. when the hose is being deformed.

In the embodiment shown, the barrier layer 2 is the innermost layer of the hose 1. In order to increase the stability of the barrier layer 2, said barrier layer 2 is applied to a support layer 3 made of rubber. The barrier layer 2 is in full-area contact with the support layer 3. A particularly good adherence of the barrier layer 2 to the support layer 3 is achieved in this way. A material which proved to be advantageous for the support layer 3 is synthetic rubber, said support layer 3 having a layer thickness in the range of from 0.6 mm to 1.5 mm. In the embodiment shown, a layer thickness in the range of 1.5 mm proved to be particularly advantageous.

In order to increase the stability of the hose 1, said hose 1 additionally comprises a reinforcement layer 4; it will be particularly advantageous when the reinforcement layer 4 borders on the support layer 3. A good reinforcement of the hose 1 will be achieved, when the reinforcement layer 4 is made of a synthetic fabric, preferably a polyaramid fabric.

As protection against mechanical loads, an outer cover layer 5 made of a flexible synthetic material is additionally provided. The use of synthetic rubber proved to be particularly advantageous in this connection. Due to the fact that, in the example shown, the cover layer 5 and the support layer 3 are produced from the same material, viz. synthetic rubber, and have essentially the same layer thickness, here in the range of 1.5 mm, the hose 1 can be produced at a moderate price. Furthermore, a layer thickness in the range of 1 mm to 1.5 mm for the cover layer 5 proved to be advantageous for the purpose of protection as well as for the flexibility of the hose 1. Due to the fact that the cover layer 5 borders on the reinforcement layer 4, a good stability of the hose is guaranteed.

In the following, a second embodiment will be described. In order to avoid repetitions, only the differences in comparison with the first embodiment will be explained and identical components will be designated by identical reference numerals.

The hose 1 described in FIG. 2 comprises, in addition to the embodiment shown in FIG. 1, also an interior layer 6.

The barrier layer 2 is here arranged between the interior layer 6 and the support layer 3 and is in full-area contact with said support layer 3 and said interior layer 6. In this way, the barrier layer 2 is protected more effectively, whereby the durability of the barrier layer 2 will be increased still further. It proved to be advantageous when the interior layer is made of a polymeric synthetic material, e.g. a thermoplastic polymer.

It will be advantageous when the layer thickness of the interior layer 6 is smaller than the layer thickness of the cover layer 5, in particular when the interior layer 6 has, at most, half the layer thickness of the cover layer 5, so that the flexibility of the hose 1 will not be impaired. Layer thicknesses which proved to be particularly advantageous in this respect are layer thicknesses in the range of 0.5 mm for the interior layer 6, in the range of 0.6 mm for the support layer 3 and in the range of 1.2 mm for the cover layer 5.

In the following, a third embodiment will be described. In order to avoid repetitions, only the differences in comparison with the first and the second embodiment will be explained and identical components will be designated by identical reference numerals.

In the case of the embodiment shown in FIG. 3, the barrier layer is profiled, whereby a particularly high flexibility of the hose 1 can be achieved.

In order to increase the adherence of the corrugated barrier layer 2, a compensation layer 7 made of a thermoplastic polymer is provided between the interior layer 6 and the barrier layer 2. The use of FPM and of an adhesive agent proved to be advantageous for this purpose. The barrier layer 2 is in full-area contact with the support layer 3 and the compensation layer 7.

Due to the fact that the compensation layer 7 has an amplitude following the profile of the barrier layer 2 and a smooth inner side, a particularly good adherence is guaranteed.

It will be particularly advantageous when the cover layer 5 has a layer thickness in the range of 1 mm, whereby a high stability and, simultaneously, a high flexibility of the hose 1 will be guaranteed.

In the case of such a hose 1, the necessary flexibility for the barrier layer 2 is obtained from the profile and the mechanical strength from the other layers. The admissible deformations of the whole composite structure of this hose will thus not be exceeded in the case of any layer.

In addition, it is possible to achieve an increased diffusion resistance of the entire hose 1 in combination with an improved flexibility as well as a good interengagement of the corrugated barrier layer 2 and of the other layers.

On the basis of the possibility of combining a smooth layer with a profiled stiffer layer, it is, in particular, possible to produce an emission-optimized hose, which can be produced in a continuous process and cut to an arbitrary length but nevertheless connected at the hose ends to connection elements, which are not shown.

An embodiment which proved to be particularly durable and moderate in price is an embodiment in the case of which the barrier layer 2 is applied in the form of rolled foils wound around the compensation layer 7.

In the case of the hoses described and the method disclosed hereinbefore, materials which are suitable for a strong reduction of diffusion losses and which are normally stiff have successfully been integrated in a hose 1 while still guaranteeing a high flexibility of said hose 1. A detachment of the various layers, e.g. when the hose 1 is bent or as a result of vibrations, can be prevented effectively. Due to the fact that the metallic barrier layer 2 is covered by at least one further layer 3, the mechanical loads caused by an application of pressure and by outer mechanical movements are absorbed by the softer layer 3.

What is claimed is:

1. A multilayer flexible hose, comprising a support layer and a profiled metallic barrier layer which is fixedly connected to said support layer, the support layer being made of rubber and the barrier layer having a layer thickness between 0.1 mm and 0.5 mm, wherein a compensation layer is provided between an interior layer and the barrier layer, the compensation layer having an amplitude following the profile of the barrier layer and a smooth inner side.

2. A multilayer flexible hose according to claim 1, wherein the support layer is made of synthetic rubber.

3. A multilayer flexible hose according claim 1, wherein the barrier layer is in full-area contact with the support layer and/or a neighbouring layer.

4. A multilayer flexible hose according to claim 1, wherein the barrier layer is made of aluminium.

5. A multilayer flexible hose according claim 1, wherein the barrier layer is made of pure Al 99.5.

6. A multilayer flexible hose according to claim 1, wherein a reinforcement layer is provided.

7. A multilayer flexible hose according to claim 6, wherein the reinforcement layer borders on the support layer.

8. A multilayer flexible hose according to claim 6, wherein the reinforcement layer is made of a synthetic fabric.

9. A multilayer flexible hose according to claim 6, wherein the reinforcement layer is made of a polyaramid fabric.

10. A multilayer flexible hose according to claim 1, wherein an outer cover layer made of a flexible synthetic material is provided.

11. A multilayer flexible hose according to claim 10, wherein the outer cover layer is made of synthetic rubber.

12. A multilayer flexible hose according to claim 10, wherein the cover layer borders on the reinforcement layer.

13. A multilayer flexible hose according to claim 10, wherein the support layer and the cover layer have essentially the same layer thickness.

14. A multilayer flexible hose according to claim 1, wherein the support layer has a layer thickness between 0.6 mm and 1.5 mm.

15. A multilayer flexible hose according to claim 10, wherein the cover layer has a layer thickness between 1 mm and 1.5 mm.

16. A multilayer flexible hose according to claim 1, wherein the barrier layer is arranged between an interior layer and the support layer.

17. A multilayer flexible hose according to claim 1, wherein the interior layer is made of a polymeric synthetic material.

18. A multilayer flexible hose according to claim 1, wherein the interior layer is made of polyamide.

19. A multilayer flexible hose according to claim 10, wherein the layer thickness of the interior layer is smaller than the layer thickness of the cover layer.

20. A multilayer flexible hose according to claim 10, wherein the interior layer has a layer thickness which is, at most, half the layer thickness of the cover layer.

21. A multilayer flexible hose according to claim 1, wherein the interior layer has a layer thickness of 0.5 mm.

22. A multilayer flexible hose according to claim 1, wherein the compensation layer is a thermoplastic polymer layer.

23. A method of producing a multilayer flexible hose according to claim 1, wherein the barrier layer is applied in the form of a rolled foil.

24. A multilayer flexible hose according to claim 1, in combination with an automotive vehicle, wherein the hose is used for at least one of a fuel line and a coolant line.

* * * * *